United States Patent
Chen et al.

(10) Patent No.: US 11,337,527 B2
(45) Date of Patent: May 24, 2022

(54) CHAIR ARMREST

(71) Applicant: ATEC INTERNATIONAL TEAM CO., LTD., Taoyuan County (TW)

(72) Inventors: Te-Chun Chen, Taoyuan County (TW); Fu-Ming Chen, Taoyuan County (TW)

(73) Assignee: ATEC INTERNATIONAL TEAM CO., LTD., Luzhu Township (TW)

( * ) Notice: Subject to any disclaimer, the term of this patent is extended or adjusted under 35 U.S.C. 154(b) by 0 days.

(21) Appl. No.: 17/162,395

(22) Filed: Jan. 29, 2021

(65) Prior Publication Data

US 2022/0031077 A1 Feb. 3, 2022

(30) Foreign Application Priority Data

Jul. 30, 2020 (TW) ................................. 109125755

(51) Int. Cl.
*A47C 7/54* (2006.01)
*F16H 19/04* (2006.01)

(52) U.S. Cl.
CPC ............. *A47C 7/541* (2018.08); *F16H 19/04* (2013.01)

(58) Field of Classification Search
CPC ....... A47C 1/03; A47C 1/0307; A47C 1/0303; A47C 1/0308
USPC ........................... 297/411.35, 411.37, 411.38
See application file for complete search history.

(56) References Cited

U.S. PATENT DOCUMENTS

| | | | |
|---|---|---|---|
| 7,387,341 B1 * | 6/2008 | Tsai .......................... | A47C 1/03 297/411.35 |
| 8,960,801 B2 * | 2/2015 | Hu ............................ | A47C 7/54 297/411.37 |
| 9,113,711 B2 * | 8/2015 | Bock ..................... | A47C 1/0303 |
| 2017/0318966 A1 * | 11/2017 | Chen ..................... | A47C 1/0307 |
| 2021/0120958 A1 * | 4/2021 | Chen ..................... | A47C 1/0307 |

FOREIGN PATENT DOCUMENTS

GB 2524766 A * 10/2015 ........... A47C 1/0305

* cited by examiner

*Primary Examiner* — Sarah B McPartlin
(74) *Attorney, Agent, or Firm* — Muncy, Geissler, Olds & Lowe, P.C.

(57) ABSTRACT

A chair armrest which includes an armrest body, a first component, a second component, and a mounting seat is revealed. The armrest body consists of an armrest cover, an armrest base and a rectangular space formed therein. The first component is mounted in the rectangular space of the armrest body and arranged at a first sliding slot of the armrest base while the second component is mounted in the rectangular space of the armrest body and disposed on the first component. The mounting seat is for loading the armrest body. The armrest body can be moved relative to the first component, the second component, the mounting seat and the protruding axis in the lengthwise direction by the first sliding slot for position adjustment. Thereby the chair armrest can be rotated or moved in the lengthwise/widthwise direction for adjustment under the condition that the overall thickness thereof is effectively reduced.

14 Claims, 18 Drawing Sheets

CHAIR ARMREST

BACKGROUND OF THE INVENTION

The present invention relates to a chair armrest, especially to a chair armrest which provides multiple movement modes for adjustment under the condition that overall thickness thereof is effectively reduced.

The design of the chair armrest available now includes at least one kind of moveable function for position adjustment such as movement in the lengthwise direction for adjustment, movement in the widthwise direction for adjustment and/or rotation for adjustment. Take an armrest adjustment device revealed in U.S. Pat. No. 8,474,914 as an example. Refer to FIG. 7, FIG. 8, and FIG. 9, the first component 50 and the second component 60 are mounted to and located on the upper side and the lower side of the armrest base 20 respectively. Thus the overall thickness of the armrest is increased and quite thick. This not only has negative effect on the overall design aesthetics but also affects consumers' purchase intention.

SUMMARY OF THE INVENTION

Therefore it is a primary object of the present invention to provide a chair armrest in which a first component and a second component thereof are mounted in a rectangular space of an armrest body thereof and located over an armrest base of the armrest body for solving the problem of chair armrest available now that the overall thickness is too thick.

In order to achieve the above object, a chair armrest being mounted on an armrest rod on both the left side and the right side of a chair according to the present invention includes an armrest body, a first component, a second component, and a mounting seat. The armrest body is formed by an armrest cover and an armrest base assembled with the armrest cover vertically. A rectangular space is formed in the armrest body and the armrest cover is enclosed in an armrest pad. The armrest base is provided with a first sliding slot and a lengthwise first hole arranged at the inner bottom surface of the first sliding slot. The armrest cover, the armrest base, and the armrest pad are moved synchronously. The first component is mounted in the rectangular space of the armrest body and arranged at the first sliding slot of the armrest base. The first component is provided with a widthwise second hole which is corresponding to the first hole. By the first sliding slot, the armrest body can be moved relative to the first component in the lengthwise direction. The second component is mounted in the rectangular space of the armrest body and disposed on the second sliding slot of the first component. The second component includes a locking hole which is corresponding to the second hole and the first hole. The mounting seat is disposed on the top surface of the armrest rod for loading the armrest body and provided with a protruding axis which is inserted through the first hole and the second hole from bottom to top in turn to be abutting against and stopped under the locking hole of the second component. A fastener is inserted through the locking hole of the second component from top to bottom and fastened into the protruding axis of the mounting seat so that the armrest body is disposed on the mounting seat. When the armrest body is moved relative to the mounting seat in the lengthwise direction, the first component, the second component, the mounting seat and the protruding axis remain still while the armrest body is moved relative to the first component, the second component, the mounting seat and the protruding axis in the lengthwise direction by the first sliding slot for position adjustment.

Preferably, the bottom surface of the second component is mounted with a locking slot whose inner bottom surface is adjacent to and communicating with the locking hole. The mounting seat further includes a rotating slot and a cover plate. The protruding axis of the mounting seat can be removably mounted in the rotating slot. The top surface and the bottom surface of the protruding axis are further provided with a top-side protrusion and a bottom-side rotating disc respectively. The cover plate is provided with an insertion hole through which the protruding axis and the top-side protrusion are inserted to be locked into the locking slot of the second component and then the fastener is secured into the protruding axis and the top-side protrusion. When the armrest body is rotated relative to the mounting seat, the cover plate and the mounting seat remain still while the armrest body, the first component, the second component, the top-side protrusion and the bottom-side rotating disc are rotated synchronously around the center of the protruding axis in relation to the mounting seat, the rotating slot, and the cover plate for adjustment of the position.

Preferably, the armrest base is further provided with a first mounting slot and a damping gear is mounted in the first mounting slot. The bottom surface of the first component is further provided with a lengthwise first rack which is engaged with the damping gear. When the armrest body is moved and adjusted in the lengthwise direction, the first component, the second component, the mounting seat and the protruding axis stay still. Now the damping gear is rotated along the first rack so that the armrest body is able to be moved and adjusted in the lengthwise direction with damping.

Preferably, the first component is further provided with a second sliding slot. The second component is mounted in the rectangular space of the armrest body and disposed on the second sliding slot of the first component. By the second sliding slot, the first component can be moved relative to the second component in the widthwise direction. When the armrest body is moved in the widthwise direction, the second component, the mounting seat and the protruding axis remain still while the armrest body and the first component are moved relative to the protruding axis in the widthwise direction by the first hole and the second hole respectively for adjusting position.

Preferably, the first component is further provided with a second mounting slot which is provided with a damping gear therein. The bottom surface of the second component is further provided with a widthwise second rack which the damping gear is engaged with correspondingly. When the armrest body is moved and adjusted in the widthwise direction, the second component, the mounting seat and the protruding axis remain still. At the moment, the damping gear can be rotated along the second rack so that the armrest body is moved and adjusted in the widthwise direction with damping.

Preferably, the armrest body further includes an armrest opening which is formed by an opening of the armrest pad, an opening of the armrest cover, and an opening of the armrest base aligned and communicating with one another vertically. A button is inserted into the armrest opening and located in the opening of the armrest base. A plate portion is disposed on an outer end of the button while an elastic member is located on an inner end of the button and elastically abutting against a protruding wall on each lateral side of the opening of the armrest base. A protrusion portion is mounted to an inner wall of the connecting and sliding portion while a lengthwise button rack is arranged at the protrusion portion and engaged with a third rack of the first component.

Preferably, the first component is further provided with a lengthwise third hole and a fourth rack is disposed on the bottom surface of the second component. The protrusion portion of the button is further provided with a third sliding slot and a sliding block which is slidably mounted in the third sliding slot. An inclined sliding hole is disposed on and penetrating the third sliding slot while the sliding block is arranged with a sliding wing used for sliding upward or downward obliquely and smoothly in the inclined sliding hole. The top surface of the sliding block is further provided with a sliding-block's rack which is inserted through the long third hole and engaged with the fourth rack of the second component. A spring is arranged between the bottom of the sliding block and the third sliding slot for providing a rebound force to the sliding block. When the button is pressed inward, the plate portion of the button is elastically moved into the armrest opening and the sliding-block's rack on the protrusion portion of the button is moved downward in the inclined sliding hole by the sliding wing and released from the fourth rack of the second component. At the moment, the cover plate and the mounting seat stay still while the armrest body, the first component, the second component, the top-side protrusion and the bottom-side rotating disc are rotated synchronously around the center of the protruding axis in relation to the mounting seat, the rotating slot, and the cover plate for adjustment of the position.

Preferably, the plate portion of the button is pressed and elastically moved inward from the armrest opening and the button rack on the protrusion portion of the button is moved inward and disengaged from the third rack of the first component when the button is pressed inward. Thereby the armrest body can be moved and adjusted in the widthwise direction.

DETAILED DESCRIPTION OF THE PREFERRED EMBODIMENTS

The structure and technical features of the present invention are described in detail with reference to the figures. The respective figures are only used to show structure and related functions of the present invention. Thus the size of the respective components in the figures are not drawn in actual scales and not intended to limit the present invention.

Generally, a chair armrest is fastened on the left side and the right side (in view of sitters) of a chair. The lengthwise direction or the widthwise direction mentioned in the following description is viewed based on user's position.

Figure 1:
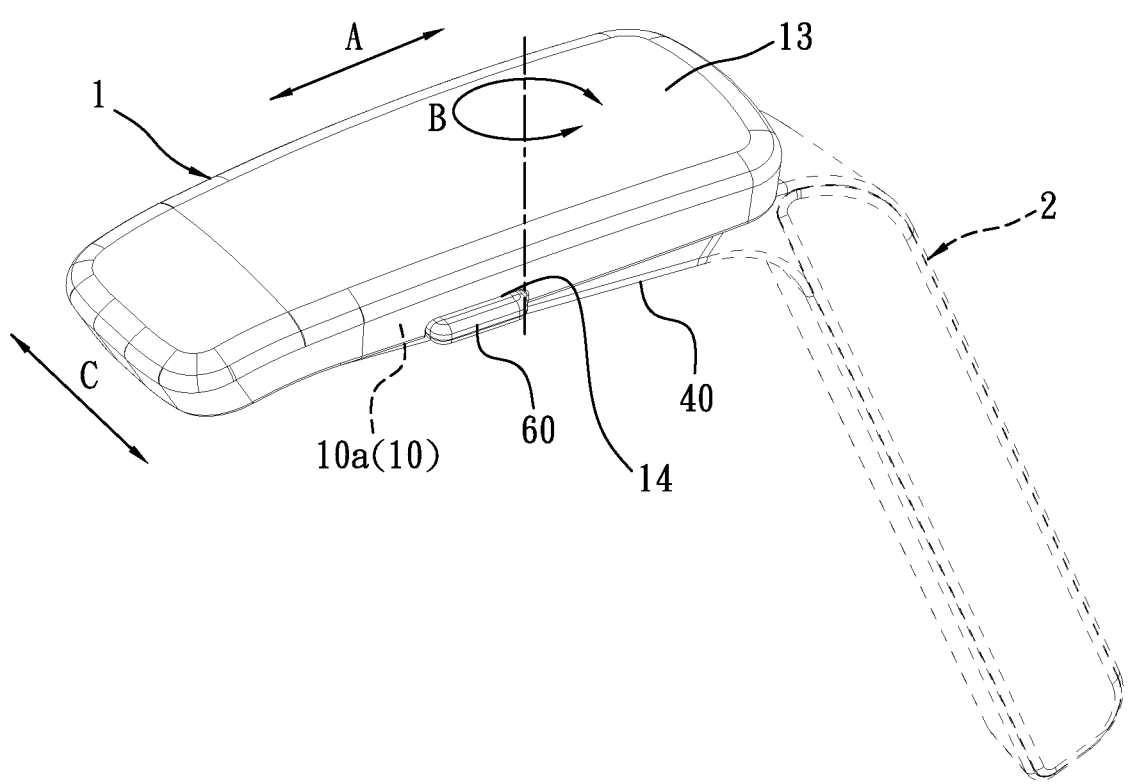
FIG. 1 is a perspective view of an embodiment according to the present invention.
Figure 2:
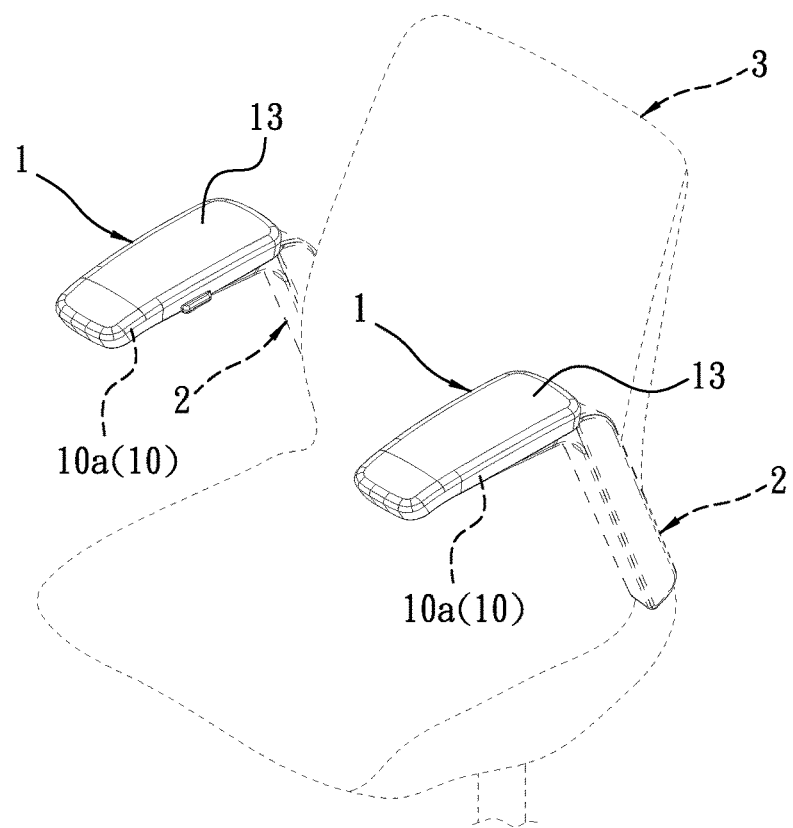
FIG. 2 is a schematic drawing showing an embodiment mounted to a chair according to the present invention.
Figure 3:
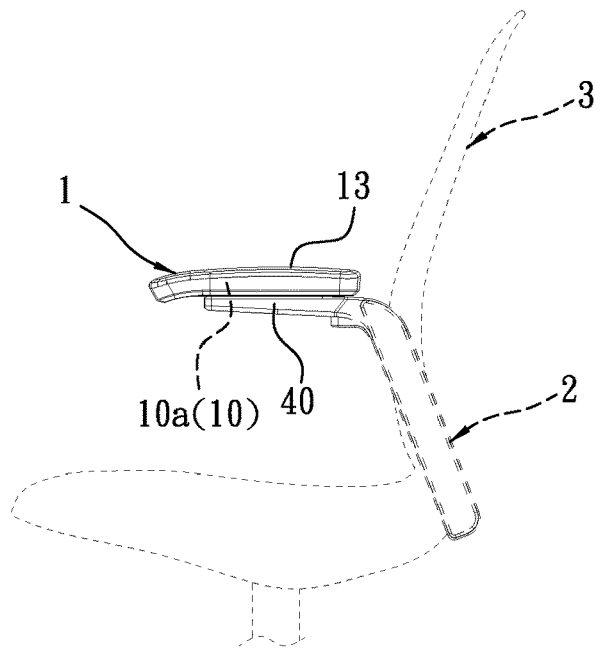
FIG. 3 is a schematic drawing showing a side view of the embodiment in FIG. 2 according to the present invention.
Figure 9:
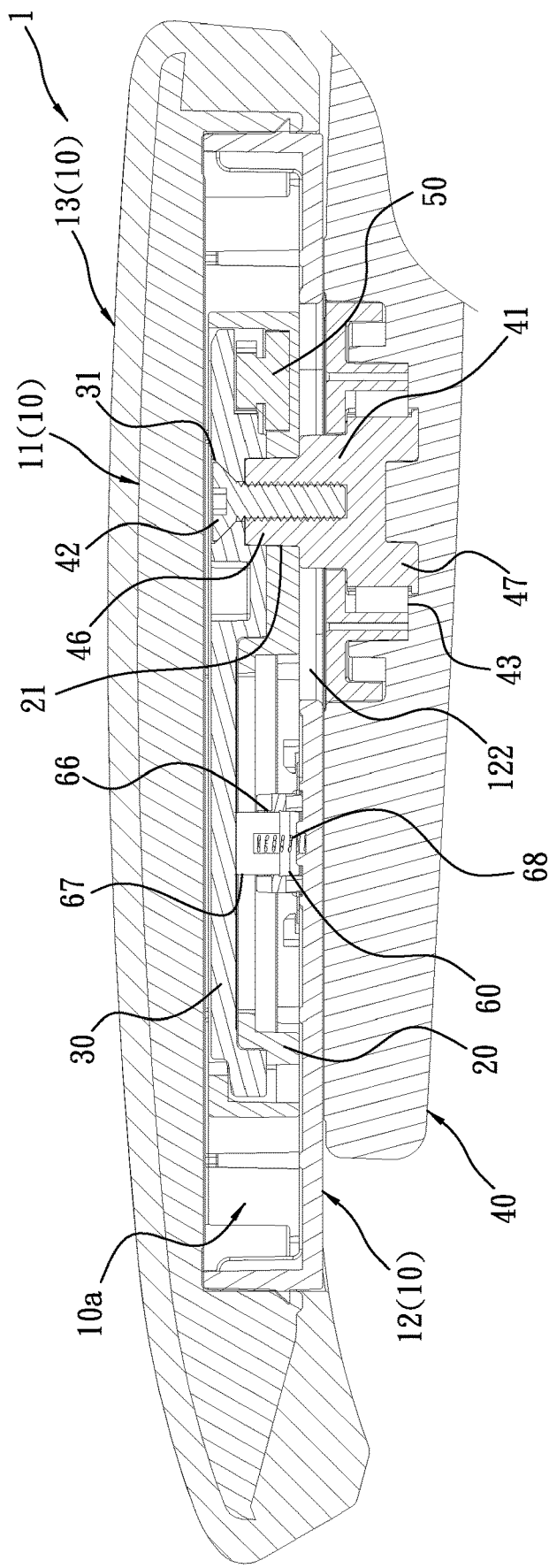
FIG. 9 is a partial sectional view of the embodiment in FIG. 1 according to the present invention.
Figure 10:
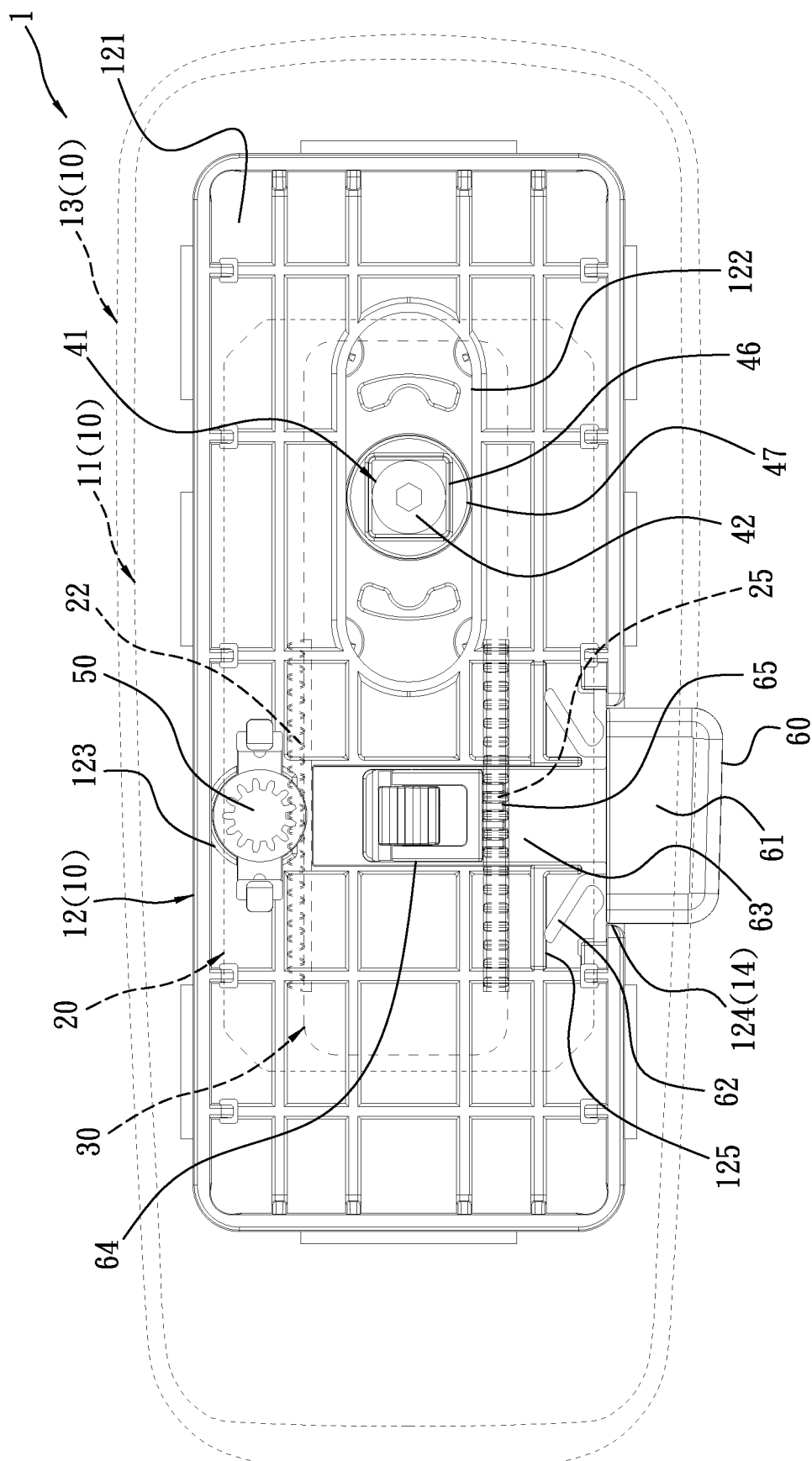
FIG. 10 is a top view of the embodiment in FIG. 1 without a mounting seat according to the present invention.
Figure 17:
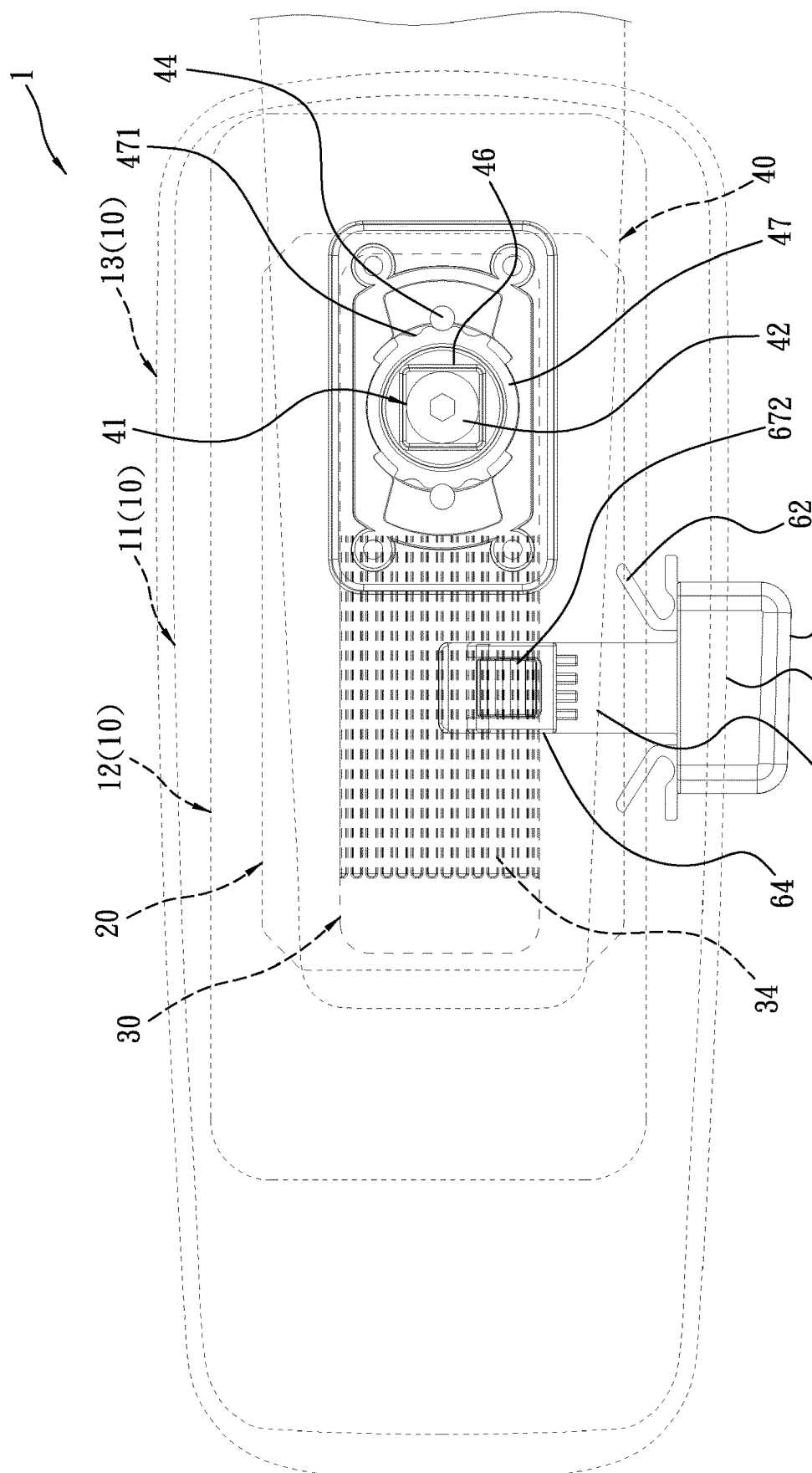
FIG. 17 is a top view of the embodiment in FIG. 1 according to the present invention.
Figure 20:
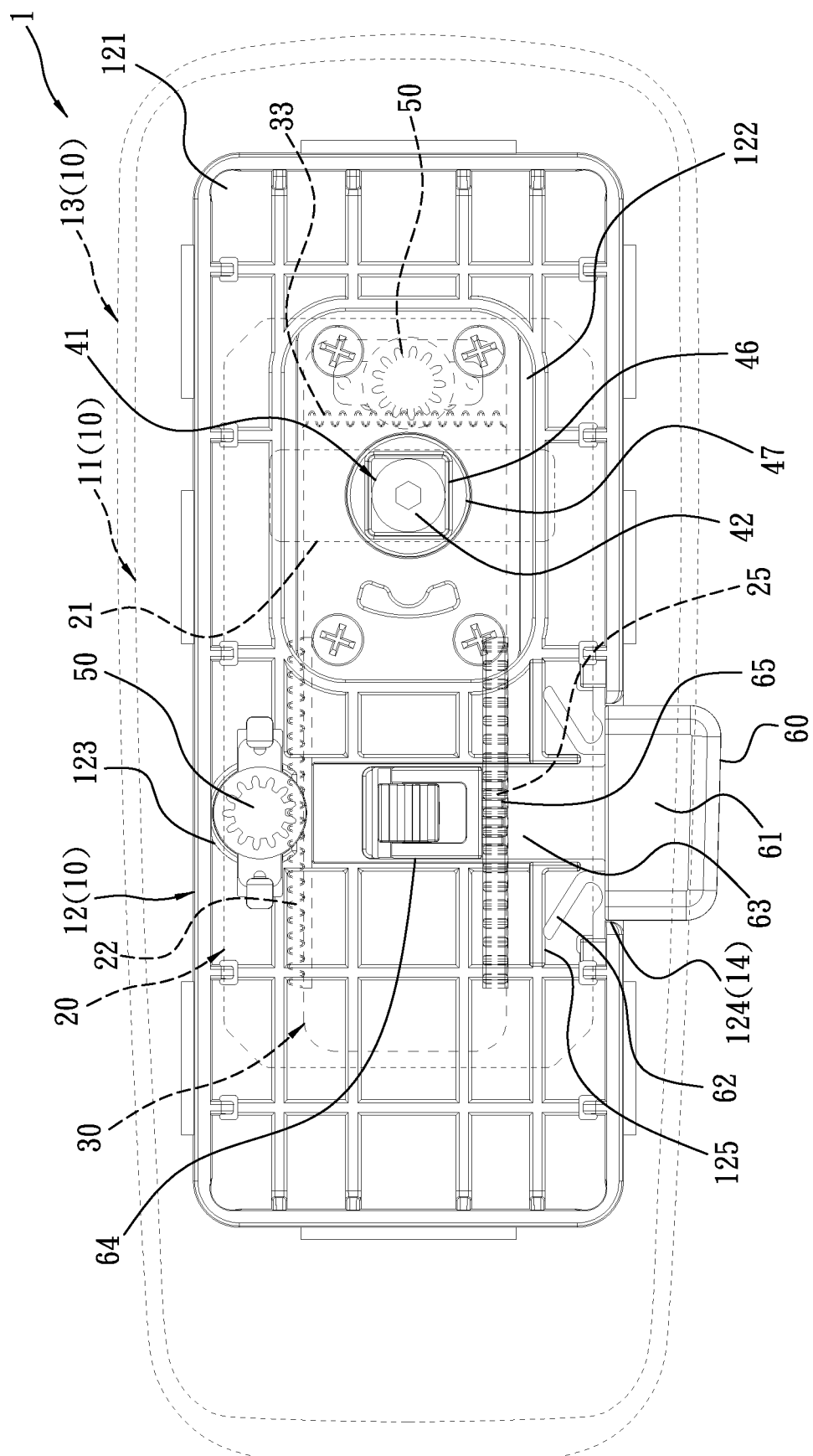
FIG. 20 is a top view of the embodiment in FIG. 1 (wherein a first hole of an armrest base is a wide rectangle) according to the present invention.
Figure 22:
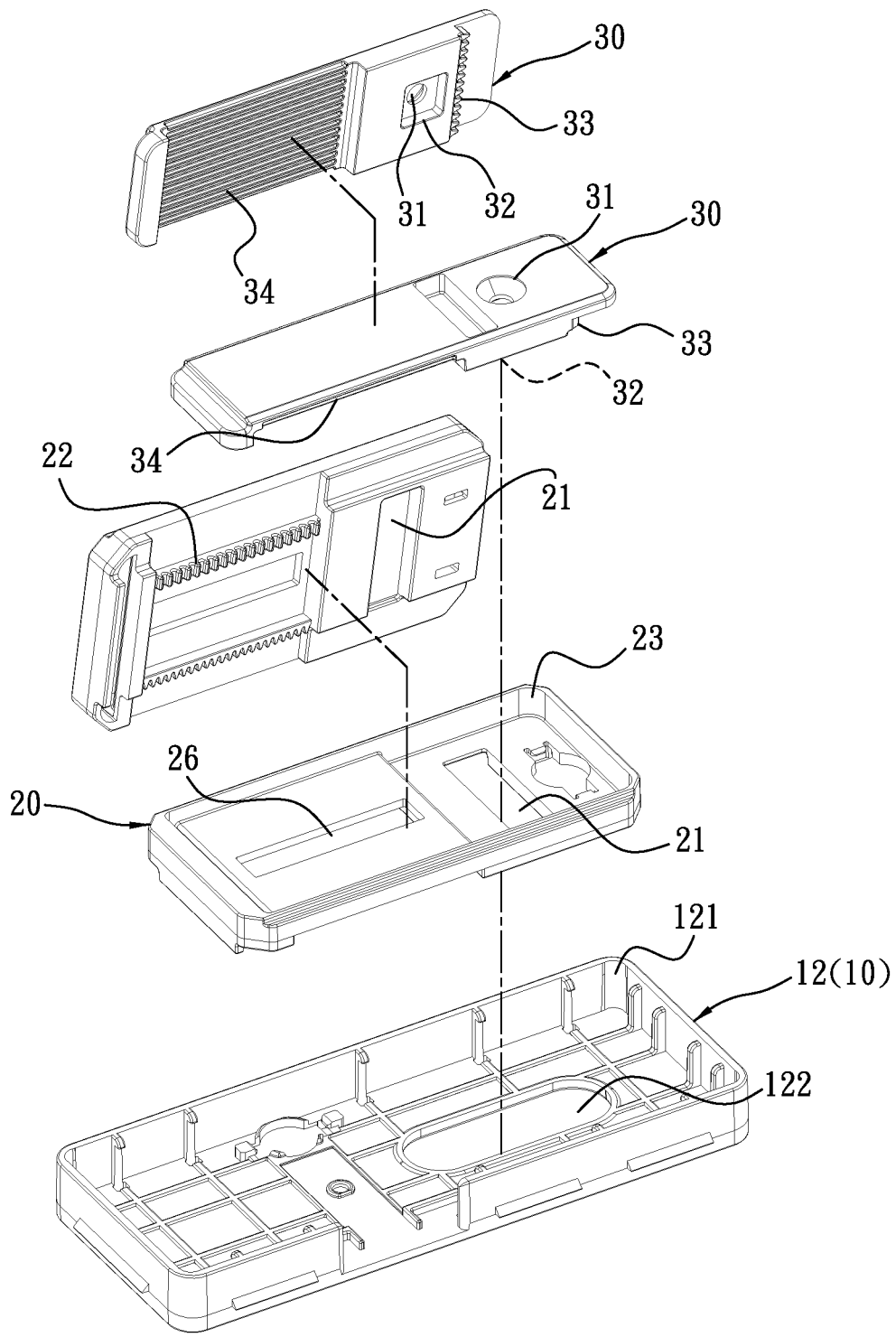
FIG. 22 is an explosive view of an armrest base, a first component and a second component of an embodiment (without a bottom and damping gears) according to the present invention.

Refer to FIG. 1-4, FIG. 9, FIG. 10, FIG. 17 and FIG. 20, a chair armrest 1 according to the present invention is mounted on an armrest rod 2 on both the left side and the right side of a chair 3, as shown in FIG. 2. The chair armrest 1 includes an armrest body 10, a first component 20, a second component 30, a mounting seat 40 and a button 60. Without the arrangement of the button 60, the chair armrest 1 can still be used, as shown in FIG. 22. Yet the button 60 helps users to lock and position the armrest body 10 on the new position after adjustment. Thus the position of the armrest body 10 will not be changed easily, as shown in FIG. 10, FIG. 17 and FIG. 20.

Figure 4:
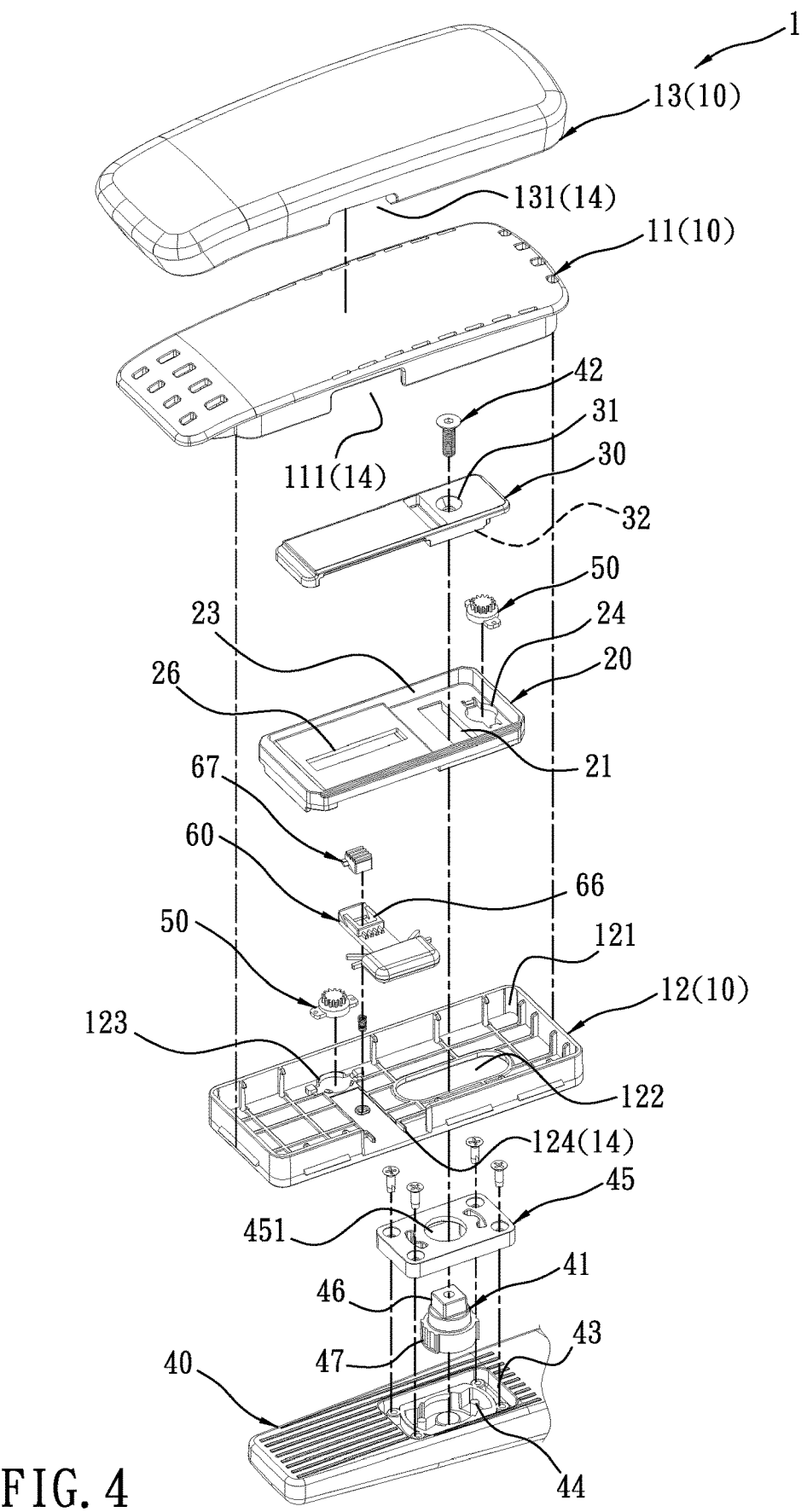
FIG. 4 is a partial explosive view of the embodiment in FIG. 1 according to the present invention.
Figure 11:
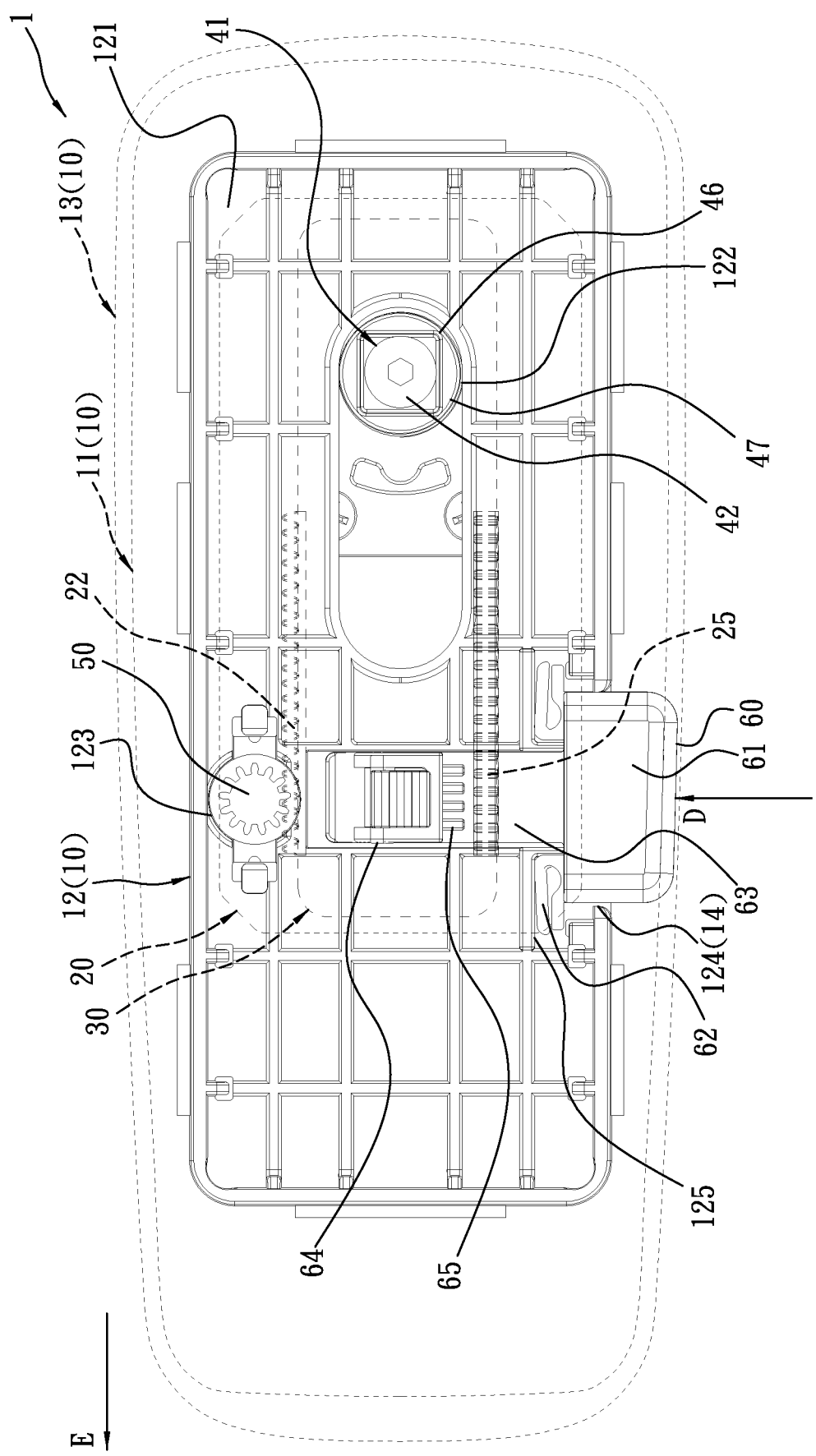
FIG. 11 is a top view of the embodiment in FIG. 10 being adjusted and moved (in the lengthwise direction) according to the present invention.
Figure 18:
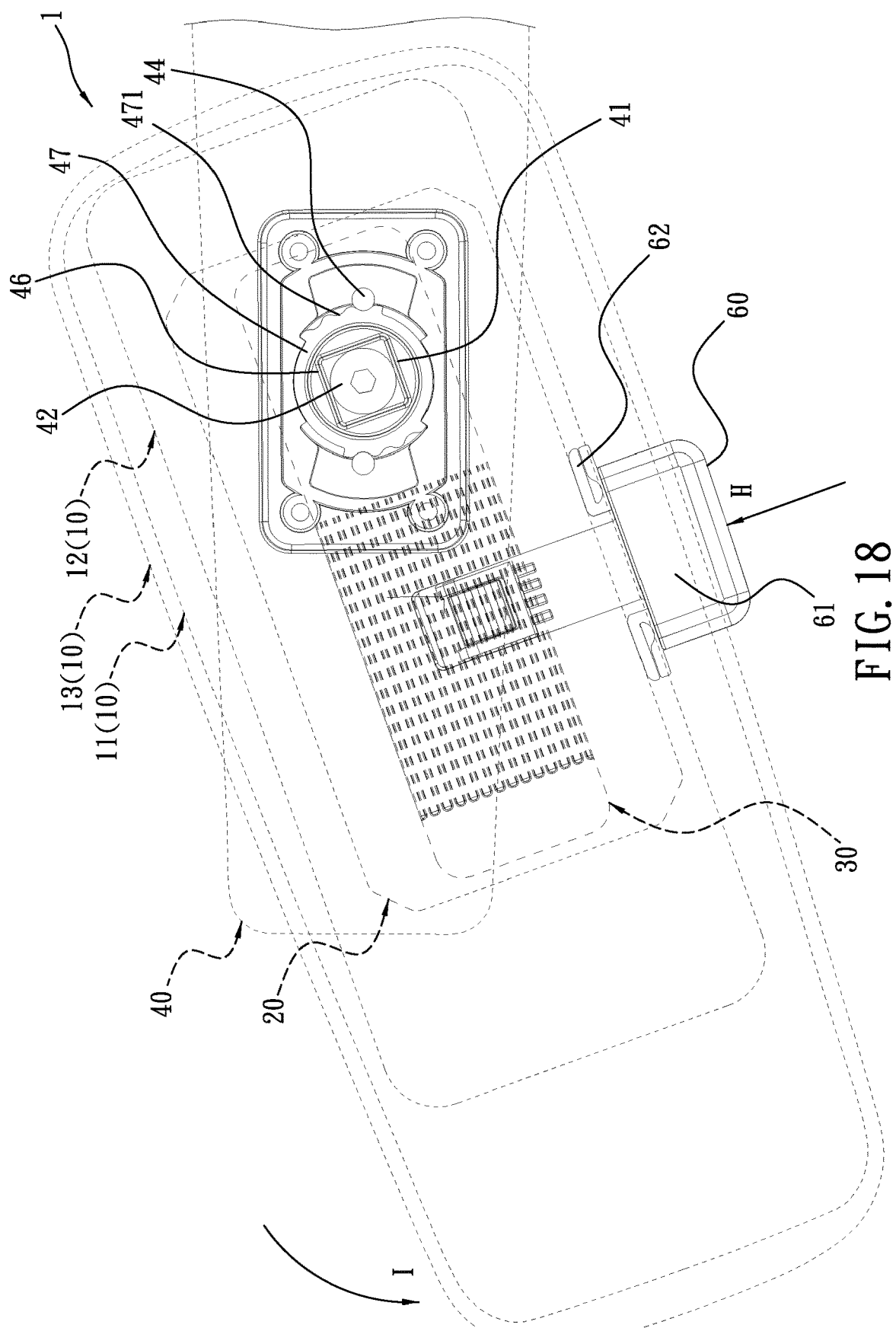
FIG. 18 is a top view of an armrest body in FIG. 17 being adjusted and moved (in rotational direction) according to the present invention.
Figure 21:
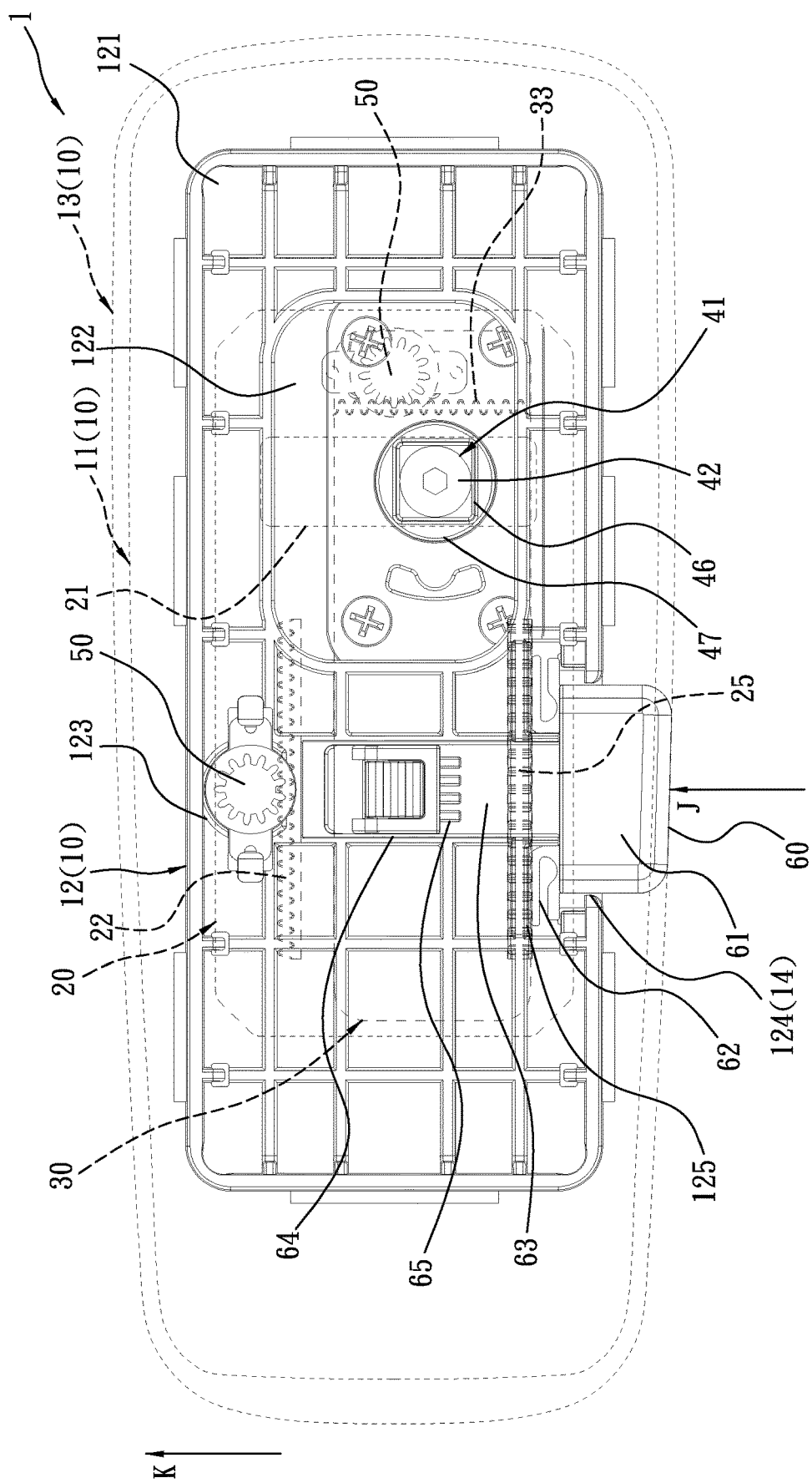
FIG. 21 is a top view of the embodiment in FIG. 20 in which an armrest body is adjusted and moved (in the widthwise direction) according to the present invention.

The armrest body 10 is formed by an armrest cover 11, an armrest base 12 assembled with the armrest cover 11 vertically, an armrest pad 13, and an armrest opening 14. As shown in FIG. 8 and FIG. 9, a rectangular space 10*a* is formed in the armrest body 10. The armrest cover 11 is enclosed in the armrest pad 13. The armrest base 12 is provided with a first sliding slot 121, a lengthwise first hole 122 arranged at the inner bottom surface of the first sliding slot 121, a first mounting slot 123, and an opening 124, as shown in FIG. 4, FIG. 7, FIG. 19 and FIG. 22. The armrest cover 11, the armrest base 12, and the armrest pad 13 are moved synchronously, as shown in FIG. 11, FIG. 18 and FIG. 21. The armrest opening 14 is formed by an opening 131 of the armrest pad 13, an opening 111 of the armrest cover 11, and the opening 124 of the armrest base 12 aligned and communicating with one another vertically, as shown in FIG. 4. Without the armrest opening 14, the armrest body 10 can still be used. Once the armrest 1 includes the button 60, the armrest opening 14 should be disposed first for mounting the button 60, as shown in FIG. 4.

Figure 19:
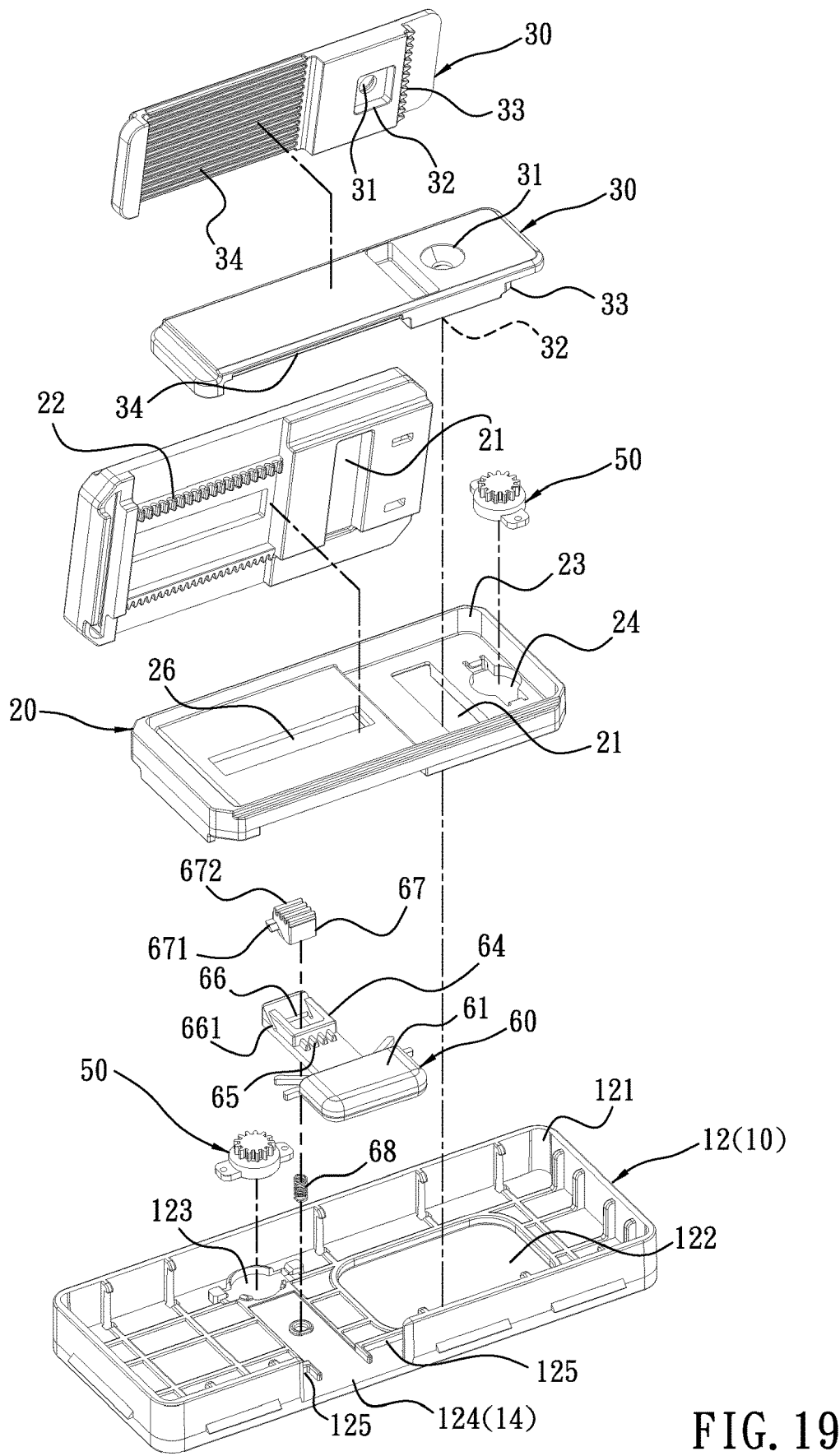
FIG. 19 is an explosive view of an armrest base (with a first hole whose shape is a wide rectangle), a first component and a second component of an embodiment according to the present invention.

As shown in FIG. 4 and FIG. 7-9, the first component 20 is mounted in the rectangular space 10a of the armrest body 10 and arranged at the first sliding slot 121 of the armrest base 12. The first component 20 is provided with a widthwise second hole 21 and a second sliding slot 23. The widthwise second hole 21 is corresponding to the first hole 122. By the first sliding slot 121, the armrest body 10 can be moved relative to the first component 20 in the lengthwise direction, as the arrow A in FIG. 1 and the arrow E in FIG. 11 indicate. As shown in FIG. 19, the first hole 122 can be a rectangle with a larger width so that the area of the first hole 122 is increased in the widthwise direction.

Figure 7:
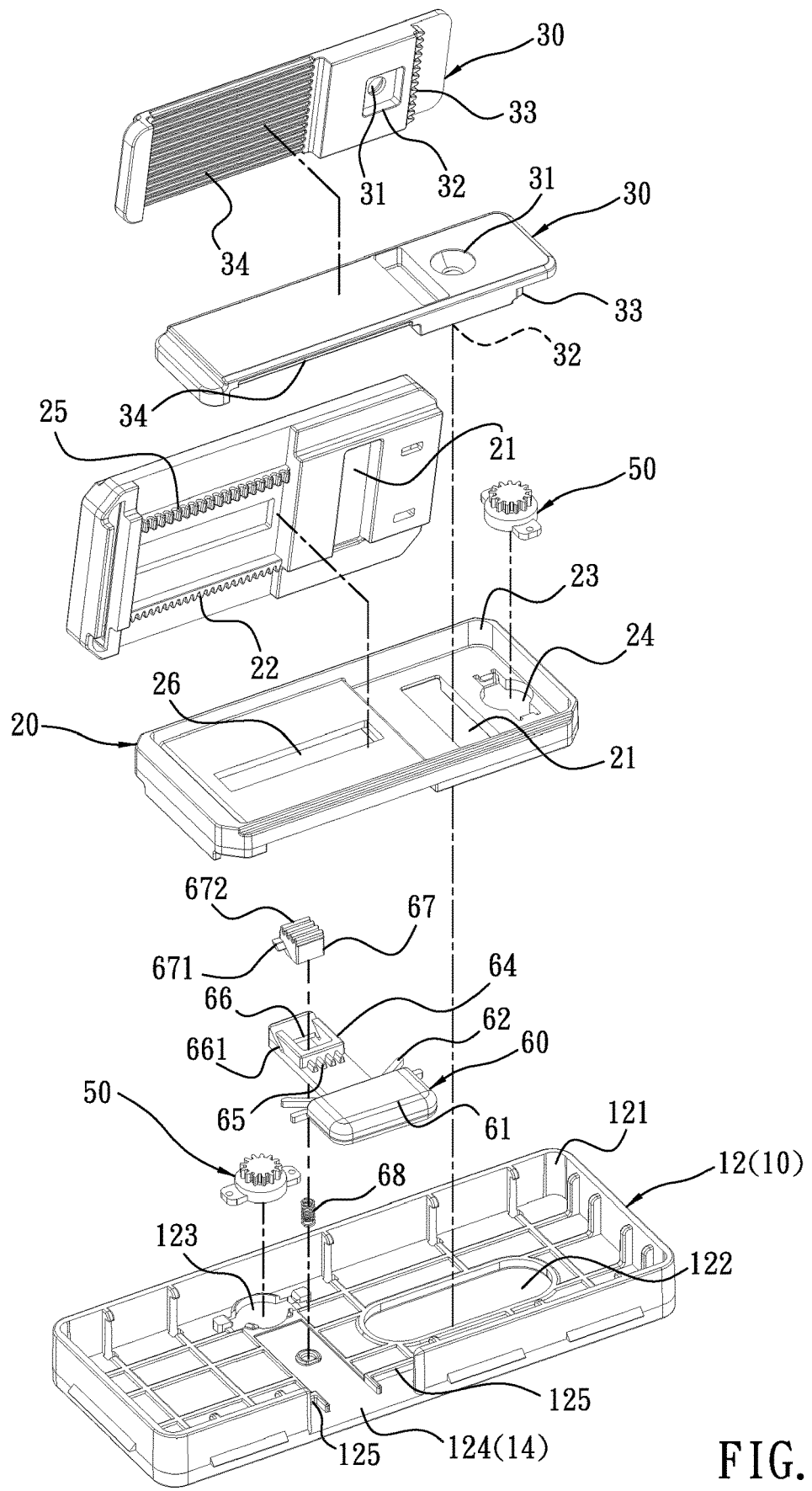
FIG. 7 is an enlarged view of an armrest base, a first component and a second component of the embodiment in FIG. 4 according to the present invention.
Figure 8:
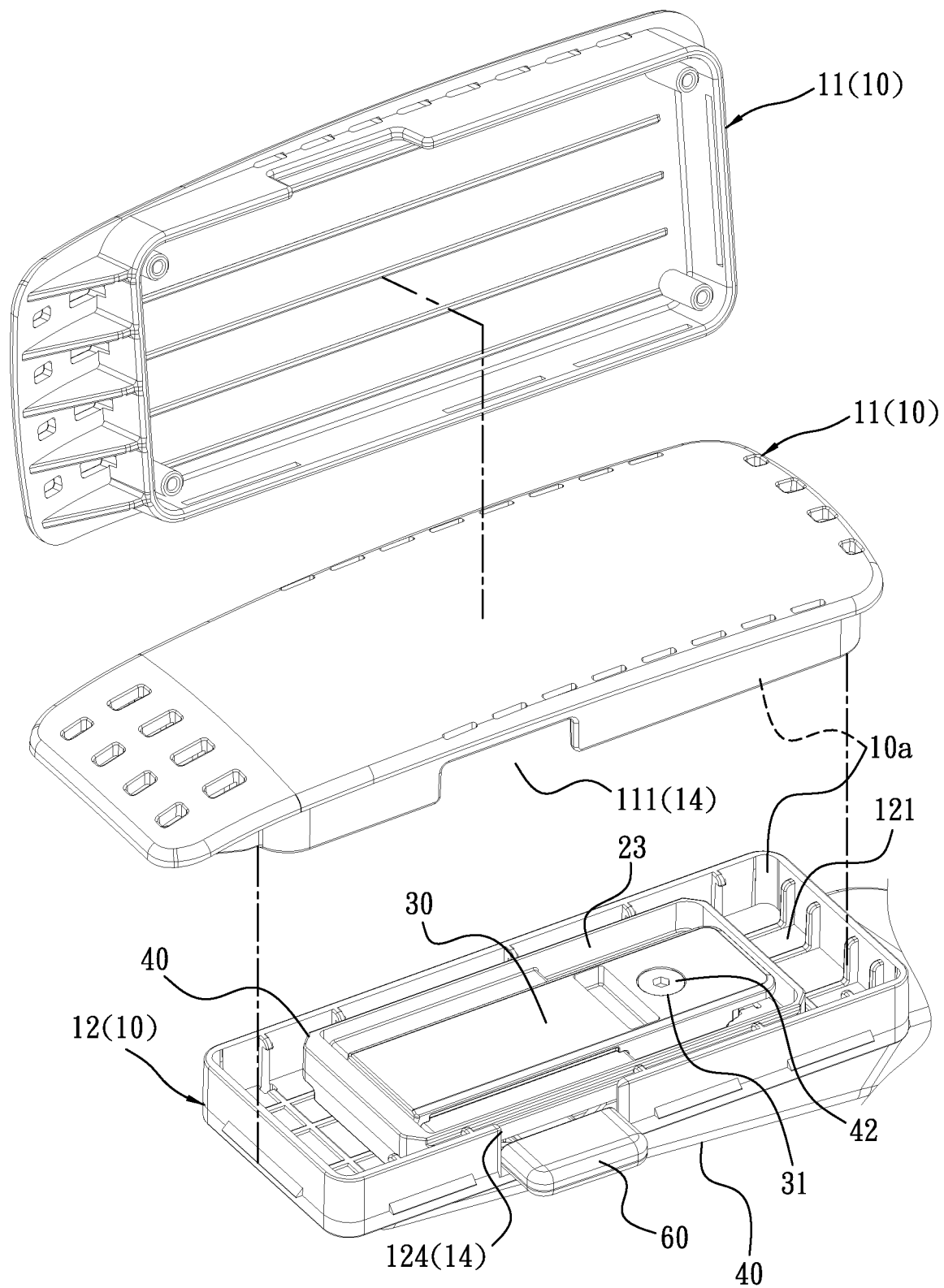
FIG. 8 is a partial explosive view of an armrest cover and an armrest pad separated from each other of the embodiment in FIG. 1 according to the present invention.

Refer to FIG. 4 and FIG. 7-9, the second component 30 is mounted in the rectangular space 10a of the armrest body 10 and disposed on the second sliding slot 23 of the first component 20. The second component 30 includes a locking hole 31 which is corresponding to the second hole 21 and the first hole 122, as shown in FIG. 4 and FIG. 7. By the second sliding slot 23, the first component 20 can be moved relative to the second component 30 in the widthwise direction, as the arrow C in FIG. 1 and the arrow K in FIG. 21 indicate.

Refer to FIG. 4, FIG. 8 and FIG. 9, the mounting seat 40 is disposed on the top surface of the armrest rod 2 for loading the armrest body 10. The mounting seat 40 is provided with a protruding axis 41 and a fastener 42. The protruding axis 41 is inserted through the first hole 122 and the second hole 21 from bottom to top in turn to be abutting against and stopped under the locking hole 31 of the second component 30. The fastener 42 is inserted through the locking hole 31 of the second component 30 from top to bottom to be fastened into the protruding axis 41 of the mounting seat 40, as shown in FIG. 4, FIG. 8 and FIG. 9. Thereby the armrest body 10 is disposed on the mounting seat 40.

Refer to FIG. 4, FIG. 7, FIG. 10 and FIG. 20, the button 60 is inserted into the armrest opening 14 and located in the opening 124 of the armrest base 12 for being pressed and operated by users. The button 6 is composed of a plate portion 61 on an outer end thereof, an elastic member 62 located on an inner end thereof and elastically abutting against a protruding wall 125 on each lateral side of the opening 124, a lengthwise connecting and sliding portion 63 arranged between the plate portion 61 and the elastic member 62, a protrusion portion 64 mounted to an inner wall of the connecting and sliding portion 63, a lengthwise button rack 65 which is arranged at the protrusion portion 64 and engaged with a third rack 25 of the first component 20, as shown in FIG. 10. As the arrow D in FIG. 11 and the arrow J in FIG. 21 indicate, the plate portion 61 of the button 60 is pressed and elastically moved inward from the armrest opening 14 and the button rack 65 on the protrusion portion 64 of the button 60 is moved inward and disengaged from the third rack 25 of the first component 20 when the button 60 is pressed inward, as shown in FIG. 11 and FIG. 21. Now the armrest body 10 can be moved and adjusted in the lengthwise direction (as the arrow A in FIG. 1 and the arrow E in FIG. 11 indicate) or in the widthwise direction (as the arrow C in FIG. 1 and the arrow K in FIG. 21 indicate).

When the armrest body 10 is moved relative to the mounting seat 40 in the lengthwise direction, the first component 20, the second component 30, the mounting seat 40 and the protruding axis 41 stay still while the armrest body 10 is moved relative to the first component 20, the second component 30, the mounting seat 40 and the protruding axis 41 in the lengthwise direction by the first sliding slot 121 for position adjustment, as shown in FIG. 10 (before the adjustment) and FIG. 11 (after the adjustment).

When the armrest body 10 is moved in the widthwise direction, the second component 30, the mounting seat 40 and the protruding axis 41 remain still while the armrest body 10 and the first component 20 are moved relative to the protruding axis 41 in the widthwise direction by the first hole 122 and the second hole 21 respectively for position adjustment, as shown in FIG. 20 (before the adjustment) and FIG. 21 (after the adjustment).

Figure 5:
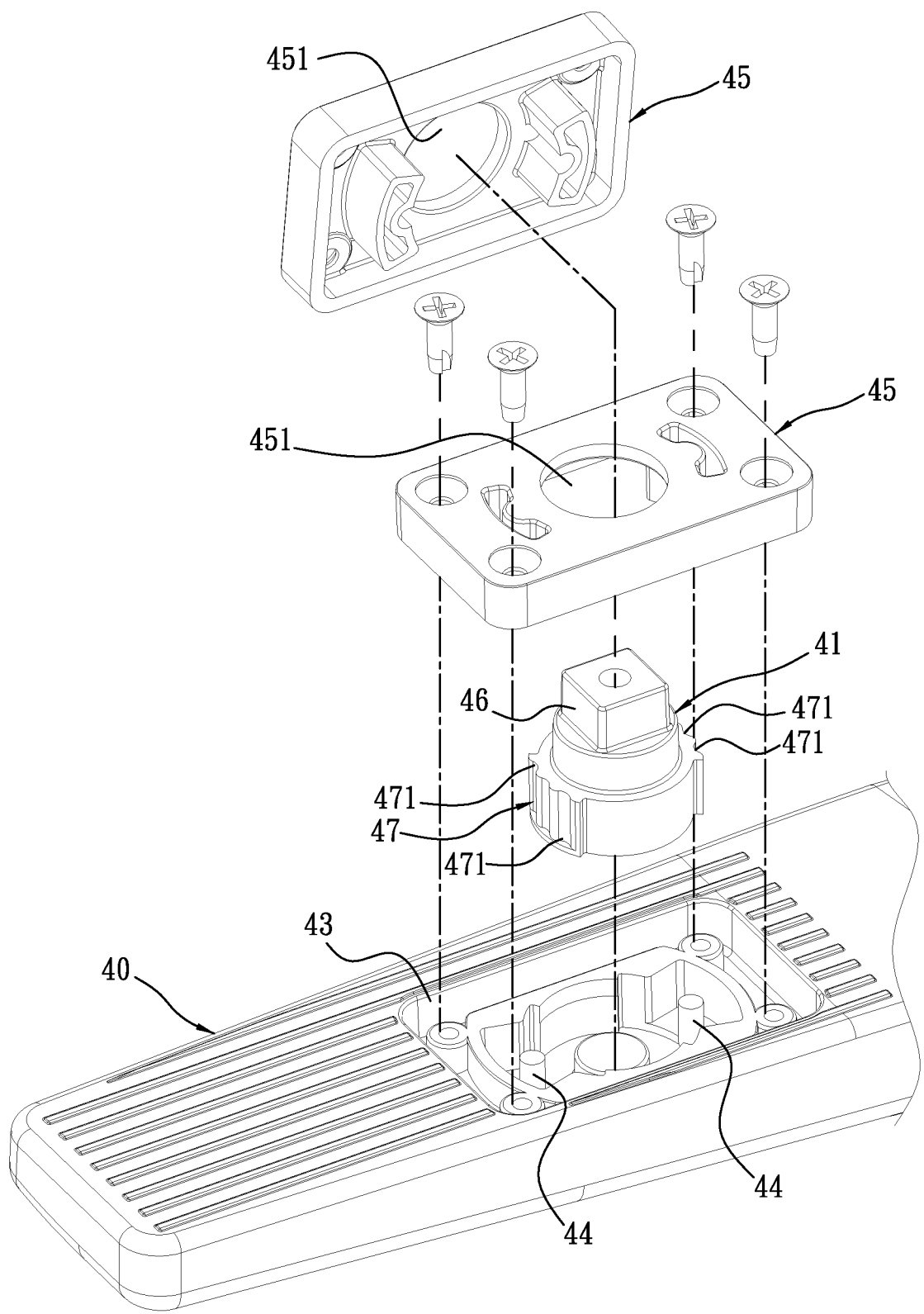
FIG. 5 is a partial enlarged view of a mounting seat, a protruding axis and a cover plate of the embodiment in FIG. 4 according to the present invention.
Figure 6:
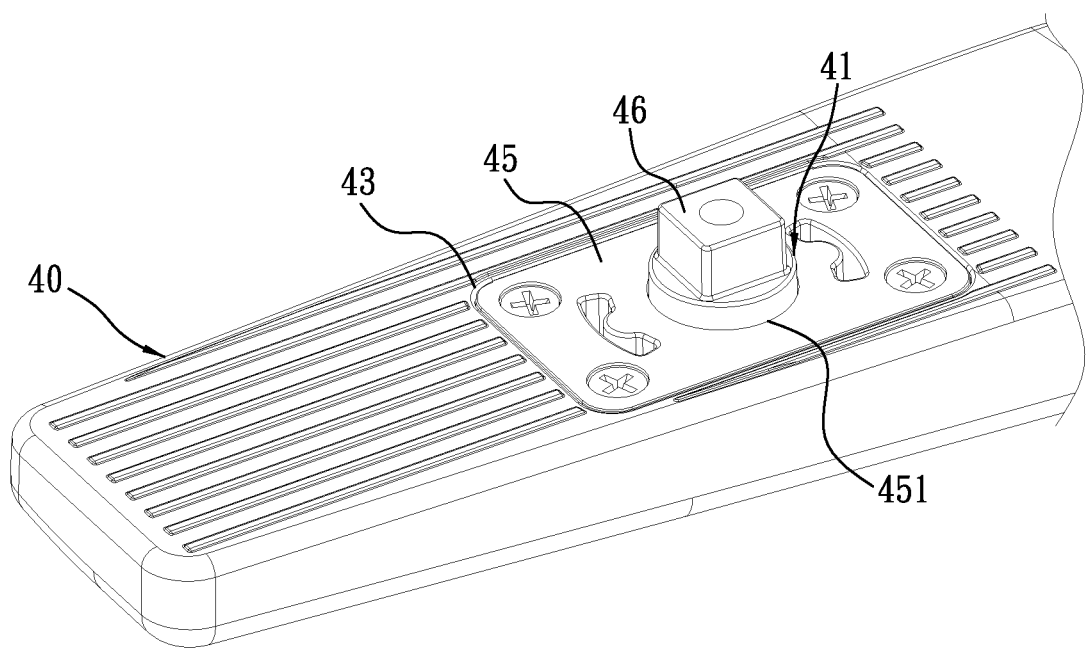
FIG. 6 is a partial assembled view of a mounting seat, a protruding axis and a cover plate of the embodiment in FIG. 5 according to the present invention.

Refer to FIG. 4, FIG. 7 and FIG. 19, the first component 20 is further provided with a lengthwise third hole 26 and the bottom surface of the second component 30 is mounted with a locking slot 32 whose inner bottom surface is adjacent to and communicating with the locking hole 31, as shown in FIG. 7. The mounting seat 40 further includes a rotating slot 43, at least one positioning member 44 and a cover plate 45, as shown in FIG. 4-6. The protruding axis 41 of the mounting seat 40 can be removably mounted in the rotating slot 43. The top surface and the bottom surface of the protruding axis 41 are further provided with a top-side protrusion 46 and a bottom-side rotating disc 47 respectively, as shown in FIG. 5. At least one positioning slot 471 is form on a peripheral wall of the rotating disc 47 for mounting the positioning member 44 therein, as shown in FIG. 5. The cover plate 45 is provided with an insertion hole 451 through which the protruding axis 41 and the top-side protrusion 46 on top of the protruding axis 41 are inserted to be locked into the locking slot 32 of the second component 30 and then the fastener 42 is secured into the protruding axis 41 and the top-side protrusion 46, as shown in FIG. 4, FIG. 8 and FIG. 9. A fourth rack 34 is further disposed on the bottom surface of the second component 30.

Figure 12:
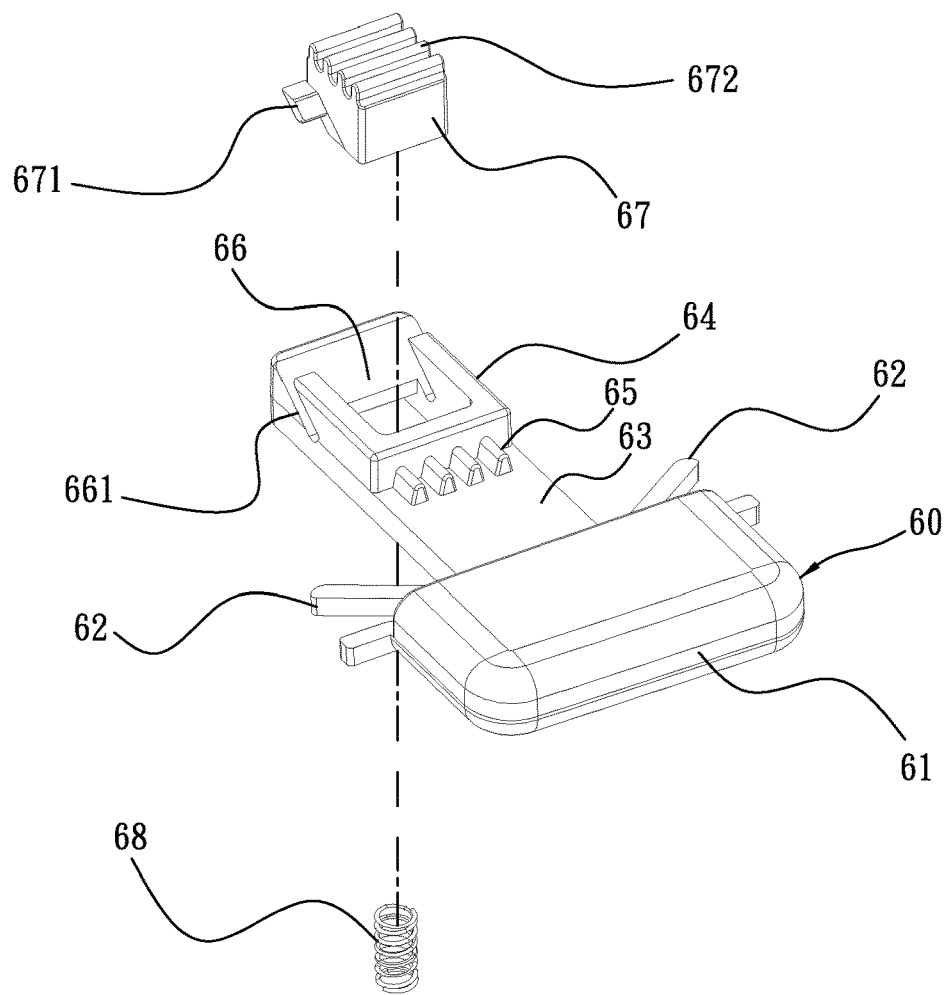
FIG. 12 is an enlarged view of the button in FIG. 4 according to the present invention.
Figure 13:
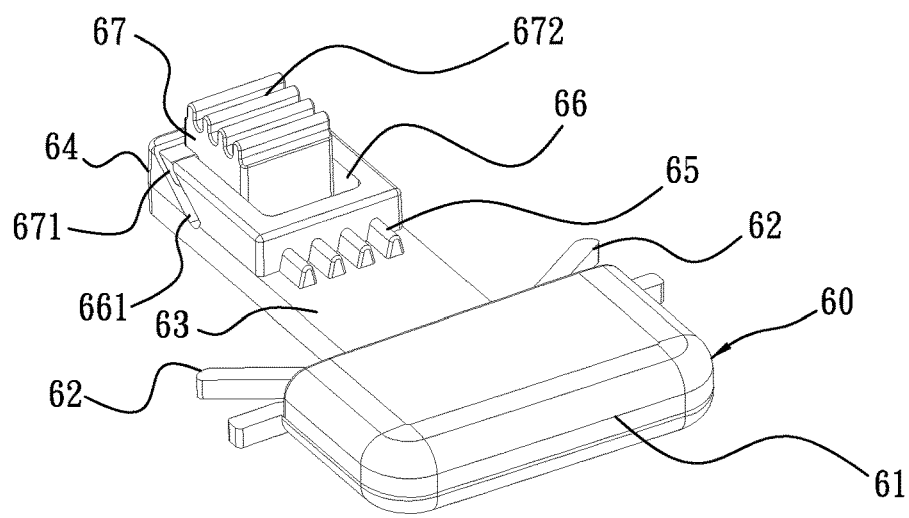
FIG. 13 is a perspective view of the button in FIG. 12 according to the present invention.
Figure 14:
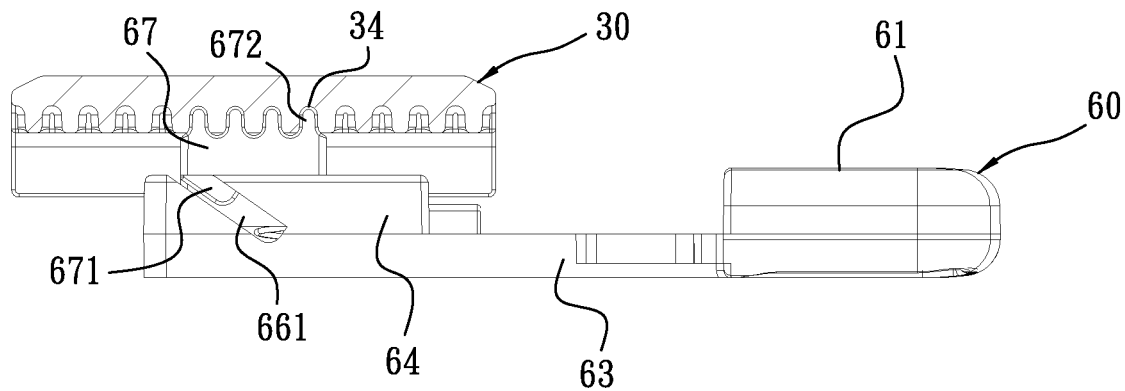
FIG. 14 is partial sectional view showing a sliding-block's rack on the button being engaged with a fourth rack of the second component according to the present invention.

The protrusion portion 64 of the button 6 is further provided with a third sliding slot 66 and a sliding block 67 which is slidably mounted in the third sliding slot 66, as shown in FIG. 7 and FIG. 12-16. An inclined sliding hole 661 is disposed on and penetrating the third sliding slot 66, as shown in FIG. 12-16. The sliding block 67 is arranged with a sliding wing 671 used for sliding upward or downward obliquely and smoothly in the inclined sliding hole 661, as the arrow G in FIG. 15 indicates. The top surface of the sliding block 67 is further provided with a sliding-block's rack 672 which is inserted through the long third hole 26 and engaged with the fourth rack 34 of the second component 30, as shown in FIG. 14. A spring 68 is arranged between the bottom of the sliding block 67 and the third sliding slot 66 for providing a rebound force to the sliding block 67, as shown in FIG. 12.

Figure 15:
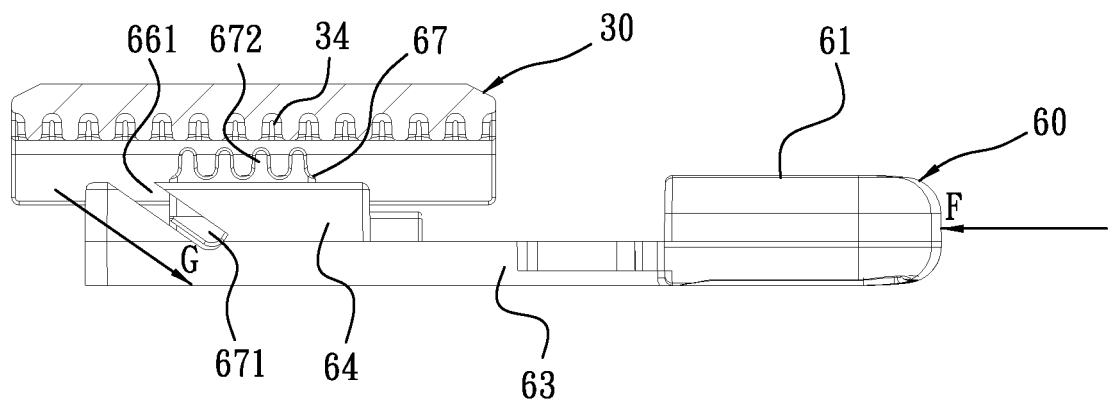
FIG. 15 is partial sectional view showing a sliding-block's rack on the button being released from a fourth rack of the second component according to the present invention.
Figure 16:
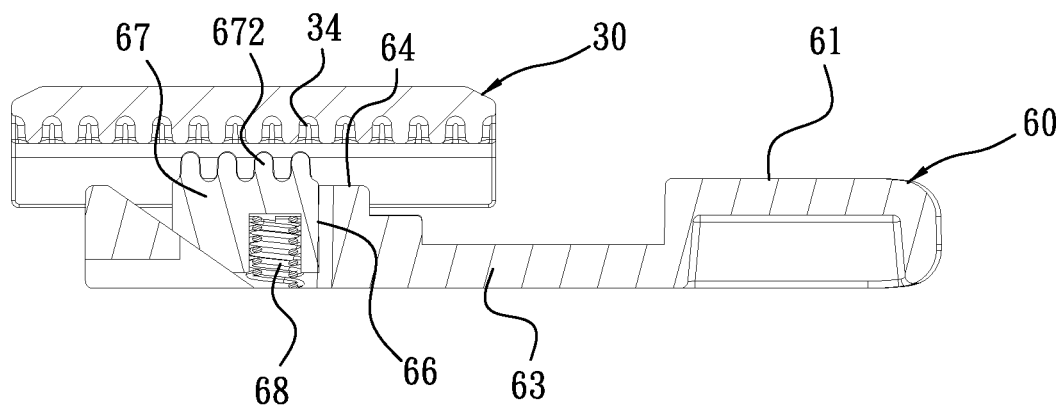
FIG. 16 is sectional view showing a sliding-block's rack on the button being released from a fourth rack of the second component according to the present invention.

When the button 60 is pressed inward (as the arrow F in FIG. 15 and the arrow H in FIG. 18 indicate), the plate portion 61 of the button 6 is elastically moved into the armrest opening 14 and the sliding-block's rack 672 on the protrusion portion 64 of the button 6 is moved downward in the inclined sliding hole 661 by the sliding wing 671 (as the arrow G in FIG. 15 indicates) and released from the fourth rack 34 of the second component 30, as shown in FIG. 15 and FIG. 16. At the moment, the cover plate 45 and the mounting seat 40 remain still while the armrest body 10, the first component 20, the second component 30, the top-side protrusion 46 and the bottom-side rotating disc 47 are rotated synchronously around the center of the protruding axis 41 in relation to the mounting seat 40, the rotating slot 43, and the cover plate 45 (s the arrow B in FIG. 1 and the arrow I in FIG. 18 indicate) for adjustment of the position, as shown in FIG. 18.

Refer to FIG. 18, the armrest body 10 is stopped after being adjusted within a certain range of angle when the positioning member 44 is locked into one of the positioning slots 471 during the rotation for position adjustment. Thus the armrest body 10 can be positioned quickly in response to user's operation.

Refer to FIG. 7, FIG. 10 and FIG. 11, a damping gear 50 is mounted in the first mounting slot 123 of the armrest base 12 while the bottom surface of the first component 20 is further provided with a first rack 22 in the lengthwise direction. The damping gear 50 is engaged with the first rack 22 correspondingly, as shown in FIG. 10. When the armrest body 10 is moved and adjusted in the lengthwise direction, the first component 20, the second component 30, the mounting seat 40 and the protruding axis 41 stay still. Now the damping gear 50 is rotated along the first rack 22 so that the armrest body 10 is able to be moved and adjusted in the lengthwise direction with damping, as the arrow E in FIG. 11 indicates.

Refer to FIG. 7, FIG. 20 and FIG. 21, the first component 20 is further provided with a second mounting slot 24 and a damping gear 50 is mounted in the second mounting slot 24 while the bottom surface of the second component 30 is further provided with a second rack 33 in the widthwise direction. The damping gear 50 is engaged with the second rack 33 correspondingly, as shown in FIG. 20. When the armrest body 10 is moved and adjusted in the widthwise direction, the second component 30, the mounting seat 40 and the protruding axis 41 remain still. At the moment, the damping gear 50 can be rotated along the second rack 33 so that the armrest body 10 is moved and adjusted in the widthwise direction with damping, as the arrow K in FIG. 21 indicates. As shown in FIG. 22, the chair armrest 1 can still be operated without the arrangement of the damping gears 50. Yet the arrangement of the damping gears 50 provides users more smooth operation of the chair armrest 1 and this makes the product more competitive on the market.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

The invention claimed is:

1. A chair armrest which is mounted on an armrest rod on a left side and/or a right side of a chair comprising:
   an armrest body which includes an armrest cover, an armrest base assembled with the armrest cover vertically, and an armrest pad which the armrest cover is enclosed therein while a rectangular space is formed in the armrest body; wherein the armrest base is provided with a first sliding slot and a lengthwise first hole arranged at an inner bottom surface of the first sliding slot, wherein the armrest cover, the armrest base, and the armrest pad are moved synchronously;
   a first component which is mounted in the rectangular space of the armrest body, arranged at the first sliding slot of the armrest base, and provided with a widthwise second hole corresponding to the first hole; wherein the armrest body is moved relative to the first component in the lengthwise direction by the first sliding slot;
   a second component which is mounted in the rectangular space of the armrest body, disposed on the first component, and having a locking hole corresponding to both the second hole and the first hole; and
   a mounting seat which is disposed on a top surface of the armrest rod for loading the armrest body and provided with a protruding axis able to be inserted through the first hole and the second hole from bottom to top in turn to be abutting against and stopped under the locking hole of the second component; the armrest body being disposed on the mounting seat by a fastener being inserted through the locking hole of the second component from top to bottom and fastened into the protruding axis of the mounting seat;
wherein the first component, the second component, the mounting seat and the protruding axis remain still while the armrest body is moved relative to the first component, the second component, the mounting seat and the protruding axis in the lengthwise direction by the first sliding slot for position adjustment when the armrest body is moved relative to the mounting seat in the lengthwise direction.

2. The chair armrest as claimed in claim 1, wherein a bottom surface of the second component is mounted with a locking slot whose inner bottom surface is adjacent to and communicating with the locking hole; wherein the mounting seat further includes a rotating slot and a cover plate; wherein the protruding axis of the mounting seat is removably mounted in the rotating slot while a top surface and a bottom surface of the protruding axis are further provided with a top-side protrusion and a bottom-side rotating disc respectively; wherein the cover plate is provided with an insertion hole through which the protruding axis and the top-side protrusion are inserted to be locked into the locking slot of the second component and the fastener is secured into the protruding axis and the top-side protrusion; wherein the cover plate and the mounting seat remain still while the armrest body, the first component, the second component, the top-side protrusion and the bottom-side rotating disc are rotated synchronously around the center of the protruding axis in relation to the mounting seat, the rotating slot, and the cover plate for adjusting position when the armrest body is rotated relative to the mounting seat.

3. The chair armrest as claimed in claim 1, wherein the armrest base is further provided with a first mounting slot and a damping gear is mounted in the first mounting slot; wherein a bottom surface of the first component is further provided with a lengthwise first rack which is engaged with the damping gear; wherein the first component, the second component, the mounting seat and the protruding axis stay still while the damping gear is rotated along the first rack to make the armrest body have lengthwise adjustment and movement with damping when the armrest body is moved and adjusted in the lengthwise direction.

4. A chair armrest which is mounted on an armrest rod on a left side and/or a right side of a chair comprising:
   an armrest body which includes an armrest cover, an armrest base assembled with the armrest cover vertically, and an armrest pad which the armrest cover is enclosed therein while a rectangular space is formed in the armrest body; wherein the armrest base is provided with a first sliding slot and a lengthwise first hole arranged at an inner bottom surface of the first sliding slot, wherein the armrest cover, the armrest base, and the armrest pad are moved synchronously;

a first component which is mounted in the rectangular space of the armrest body, arranged at the first sliding slot of the armrest base, and provided with a second sliding slot and a widthwise second hole corresponding to the first hole; wherein the armrest body is moved relative to the first component in the lengthwise direction by the first sliding slot;

a second component which is mounted in the rectangular space of the armrest body, arranged at the second sliding slot of the first component, and having a locking hole corresponding to both the second hole and the first hole; wherein the first component is moved relative to the second component in the widthwise direction by the second sliding slot; and a mounting seat which is disposed on a top surface of the armrest rod for loading the armrest body and provided with a protruding axis able to be inserted through the first hole and the second hole from bottom to top in turn to be abutting against and stopped under the locking hole of the second component; the armrest body being disposed on the mounting seat by a fastener being inserted through the locking hole of the second component from top to bottom and fastened into the protruding axis of the mounting seat;

wherein the first component, the second component, the mounting seat and the protruding axis remain still while the armrest body is moved relative to the first component, the second component, the mounting seat and the protruding axis in the lengthwise direction by the first sliding slot for position adjustment when the armrest body is moved relative to the mounting seat in the lengthwise direction;

wherein the second component, the mounting seat, and the protruding axis stay still while the armrest body and the first component are moved relative to the protruding axis in the widthwise direction by the first hole and the second hole respectively for position adjustment when the armrest body is moved in the widthwise direction.

5. The chair armrest as claimed in claim 4, wherein a bottom surface of the second component is mounted with a locking slot whose inner bottom surface is adjacent to and communicating with the locking hole; wherein the mounting seat further includes a rotating slot and a cover plate; wherein the protruding axis of the mounting seat is removably mounted in the rotating slot while a top surface and a bottom surface of the protruding axis are further provided with a top-side protrusion and a bottom-side rotating disc respectively; wherein the cover plate is provided with an insertion hole through which the protruding axis and the top-side protrusion are inserted to be locked into the locking slot of the second component and the fastener is secured into the protruding axis and the top-side protrusion; wherein the cover plate and the mounting seat remain still while the armrest body, the first component, the second component, the top-side protrusion and the bottom-side rotating disc are rotated synchronously around the center of the protruding axis in relation to the mounting seat, the rotating slot, and the cover plate for adjusting position when the armrest body is rotated relative to the mounting seat.

6. The chair armrest as claimed in claim 4, wherein the armrest base is further provided with a first mounting slot and a damping gear is mounted in the first mounting slot; wherein a bottom surface of the first component is further provided with a lengthwise first rack which is engaged with the damping gear; wherein the first component, the second component, the mounting seat and the protruding axis stay still while the damping gear is rotated along the first rack to make the armrest body have lengthwise adjustment and movement with damping when the armrest body is moved and adjusted in the lengthwise direction.

7. The chair armrest as claimed in claim 4, wherein the first component is further provided with a second mounting slot and a damping gear is mounted in the second mounting slot; wherein a bottom surface of the second component is further provided with a widthwise second rack which the damping gear is engaged with correspondingly; wherein the second component, the mounting seat and the protruding axis remain still while the damping gear is rotated along the second rack to make the armrest body have widthwise adjustment and movement with damping when the armrest body is moved and adjusted in the widthwise direction.

8. A chair armrest which is mounted on an armrest rod on a left side and/or a right side of a chair comprising:

an armrest body which includes an armrest cover, an armrest base assembled with the armrest cover vertically, and an armrest pad which the armrest cover is enclosed therein while a rectangular space is formed in the armrest body; wherein the armrest base is provided with a first sliding slot and a lengthwise first hole arranged at an inner bottom surface of the first sliding slot, wherein the armrest cover, the armrest base, and the armrest pad are moved synchronously; wherein the armrest body further includes an armrest opening which is formed by an opening of the armrest pad, an opening of the armrest cover, and an opening of the armrest base aligned and communicating with one another vertically;

a first component which is mounted in the rectangular space of the armrest body, arranged at the first sliding slot of the armrest base, and provided with a widthwise second hole corresponding to the first hole; wherein the armrest body is moved relative to the first component in the lengthwise direction by the first sliding slot;

a second component which is mounted in the rectangular space of the armrest body, disposed on the first component, and having a locking hole corresponding to both the second hole and the first hole;

a mounting seat which is disposed on a top surface of the armrest rod for loading the armrest body and provided with a protruding axis able to be inserted through the first hole and the second hole from bottom to top in turn to be abutting against and stopped under the locking hole of the second component; the armrest body being disposed on the mounting seat by a fastener being inserted through the locking hole of the second component from top to bottom and fastened into the protruding axis of the mounting seat; and a button which is inserted into the armrest opening, located in the opening of the armrest base, and composed of a plate portion on an outer end thereof, an elastic member located on an inner end thereof and elastically abutting against a protruding wall on each lateral side of the opening of the armrest base, a lengthwise connecting and sliding portion arranged between the plate portion and the elastic member, a protrusion portion mounted to an inner wall of the connecting and sliding portion, and a lengthwise button rack arranged at the protrusion portion and engaged with a third rack of the first component;

wherein the plate portion of the button is pressed and elastically moved inward from the armrest opening and the button rack on the protrusion portion of the button is moved inward and disengaged from the third rack of the first component when the button is pressed inward; now the first component, the second component, the mounting seat and the protruding axis remain still while the armrest body is moved relative to the first component, the second component, the mounting seat and the protruding axis in the lengthwise direction by the first sliding slot for position adjustment.

9. The chair armrest as claimed in claim 8, wherein the first component is further provided with a lengthwise third hole; wherein a bottom surface of the second component is mounted with a locking slot whose inner bottom surface is adjacent to and communicating with the locking hole; wherein the mounting seat further includes a rotating slot and a cover plate; wherein the protruding axis of the mounting seat is removably mounted in the rotating slot while a top surface and a bottom surface of the protruding axis are further provided with a top-side protrusion and a bottom-side rotating disc respectively; wherein the cover plate is provided with an insertion hole through which the protruding axis and the top-side protrusion are inserted to be locked into the locking slot of the second component and the fastener is secured into the protruding axis and the top-side protrusion; wherein the bottom surface of the second component is further provided with a fourth rack; wherein the protrusion portion of the button is further provided with a third sliding slot and a sliding block which is slidably mounted in the third sliding slot; an inclined sliding hole is disposed on and penetrating the third sliding slot while the sliding block is arranged with a sliding wing used for sliding upward or downward obliquely and smoothly in the inclined sliding hole; a top surface of the sliding block is further provided with a sliding-block's rack which is inserted through the long third hole and engaged with the fourth rack of the second component; a spring is arranged between the bottom of the sliding block and the third sliding slot for providing a rebound force to the sliding block; wherein the plate portion of the button is elastically moved into the armrest opening and the sliding-block's rack on the protrusion portion of the button is moved downward in the inclined sliding hole by the sliding wing and released from the fourth rack of the second component when the button is pressed inward; now the cover plate and the mounting seat stay still while the armrest body, the first component, the second component, the top-side protrusion and the bottom-side rotating disc are rotated synchronously around the center of the protruding axis in relation to the mounting seat, the rotating slot, and the cover plate for adjustment of the position.

10. The chair armrest as claimed in claim 8, wherein the armrest base is further provided with a first mounting slot and a damping gear is mounted in the first mounting slot; wherein a bottom surface of the first component is further provided with a lengthwise first rack which is engaged with the damping gear; wherein the first component, the second component, the mounting seat and the protruding axis stay still while the damping gear is rotated along the first rack to make the armrest body have lengthwise adjustment and movement with damping when the armrest body is moved and adjusted in the lengthwise direction.

11. A chair armrest which is mounted on an armrest rod on a left side and/or a right side of a chair comprising:
    an armrest body which includes an armrest cover, an armrest base assembled with the armrest cover vertically, and an armrest pad which the armrest cover is enclosed therein while a rectangular space is formed in the armrest body; wherein the armrest base is provided with a first sliding slot and a lengthwise first hole arranged at an inner bottom surface of the first sliding slot, wherein the armrest cover, the armrest base, and the armrest pad are moved synchronously; wherein the armrest body further includes an armrest opening which is formed by an opening of the armrest pad, an opening of the armrest cover, and an opening of the armrest base aligned and communicating with one another vertically;
    a first component which is mounted in the rectangular space of the armrest body, arranged at the first sliding slot of the armrest base, and provided with a widthwise second hole corresponding to the first hole; wherein the armrest body is moved relative to the first component in the lengthwise direction by the first sliding slot;
    a second component which is mounted in the rectangular space of the armrest body, arranged at the second sliding slot of the first component, and having a locking hole corresponding to both the second hole and the first hole; wherein the first component is moved relative to the second component in the widthwise direction by the second sliding slot;
    a mounting seat which is disposed on a top surface of the armrest rod for loading the armrest body and provided with a protruding axis able to be inserted through the first hole and the second hole from bottom to top in turn to be abutting against and stopped under the locking hole of the second component; the armrest body being disposed on the mounting seat by a fastener being inserted through the locking hole of the second component from top to bottom and fastened into the protruding axis of the mounting seat; and
    a button which is inserted into the armrest opening, located in the opening of the armrest base, and composed of a plate portion on an outer end thereof, an elastic member located on an inner end thereof and elastically abutting against a protruding wall on each lateral side of the opening of the armrest base, a lengthwise connecting and sliding portion arranged between the plate portion and the elastic member, a protrusion portion mounted to an inner wall of the connecting and sliding portion, and a lengthwise button rack arranged at the protrusion portion and engaged with a third rack of the first component;
    wherein the plate portion of the button is pressed and elastically moved inward from the armrest opening and the button rack on the protrusion portion of the button is moved inward and disengaged from the third rack of the first component when the button is pressed inward; thereby the armrest body is able to be moved and adjusted in the widthwise direction;
    wherein the first component, the second component, the mounting seat and the protruding axis remain still while the armrest body is moved relative to the first component, the second component, the mounting seat and the protruding axis in the lengthwise direction by the first sliding slot for position adjustment when the armrest body is moved relative to the mounting seat in the lengthwise direction;
    wherein the second component, the mounting seat, and the protruding axis stay still while the armrest body and the first component are moved relative to the protruding axis in the widthwise direction by the first hole and the second hole respectively for position adjustment when the armrest body is moved in the widthwise direction.

12. The chair armrest as claimed in claim 11, wherein the first component is further provided with a lengthwise third hole; wherein a bottom surface of the second component is mounted with a locking slot whose inner bottom surface is adjacent to and communicating with the locking hole; wherein the mounting seat further includes a rotating slot and a cover plate; wherein the protruding axis of the mounting seat is removably mounted in the rotating slot while a top surface and a bottom surface of the protruding axis are further provided with a top-side protrusion and a bottom-side rotating disc respectively; wherein the cover plate is provided with an insertion hole through which the protruding axis and the top-side protrusion are inserted to be locked into the locking slot of the second component and the fastener is secured into the protruding axis and the top-side protrusion; wherein the bottom surface of the second component is further provided with a fourth rack; wherein the protrusion portion of the button is further provided with a third sliding slot and a sliding block which is slidably mounted in the third sliding slot; an inclined sliding hole is disposed on and penetrating the third sliding slot while the sliding block is arranged with a sliding wing used for sliding upward or downward obliquely and smoothly in the inclined sliding hole; a top surface of the sliding block is further provided with a sliding-block's rack which is inserted through the long third hole and engaged with the fourth rack of the second component; a spring is arranged between the bottom of the sliding block and the third sliding slot for providing a rebound force to the sliding block; wherein the plate portion of the button is elastically moved into the armrest opening and the sliding-block's rack on the protrusion portion of the button is moved downward in the inclined sliding hole by the sliding wing and released from the fourth rack of the second component when the button is pressed inward; now the cover plate and the mounting seat stay still while the armrest body, the first component, the second component, the top-side protrusion and the bottom-side rotating disc are rotated synchronously around the center of the protruding axis in relation to the mounting seat, the rotating slot, and the cover plate for adjustment of the position.

13. The chair armrest as claimed in claim 11, wherein the armrest base is further provided with a first mounting slot and a damping gear is mounted in the first mounting slot; wherein a bottom surface of the first component is further provided with a lengthwise first rack which is engaged with the damping gear; wherein the first component, the second component, the mounting seat and the protruding axis stay still while the damping gear is rotated along the first rack to make the armrest body have lengthwise adjustment and movement with damping when the armrest body is moved and adjusted in the lengthwise direction.

14. The chair armrest as claimed in claim 11, wherein the first component is further provided with a second mounting slot and a damping gear is mounted in the second mounting slot; wherein a bottom surface of the second component is further provided with a widthwise second rack which the damping gear is engaged with correspondingly; wherein the second component, the mounting seat and the protruding axis remain still while the damping gear is rotated along the second rack to make the armrest body have widthwise adjustment and movement with damping when the armrest body is moved and adjusted in the widthwise direction.

* * * * *